United States Patent
Ruder et al.

(10) Patent No.: US 10,824,442 B2
(45) Date of Patent: Nov. 3, 2020

(54) METHOD AND APPARATUS FOR LOADING MULTIPLE DIFFERING VERSIONS OF A NATIVE LIBRARY INTO A NATIVE ENVIRONMENT

(71) Applicant: 650 Industries, Inc., Palo Alto, CA (US)

(72) Inventors: Jesse Kicho Ruder, Menlo Park, CA (US); James Hiroaki Ide, San Jose, CA (US); Charles Duplain Cheever, Palo Alto, CA (US); Benjamin Carroll Alcala Roth, Seattle, WA (US)

(73) Assignee: 650 Industries, Inc., Palo Alto, CA (US)

( * ) Notice: Subject to any disclaimer, the term of this patent is extended or adjusted under 35 U.S.C. 154(b) by 127 days.

(21) Appl. No.: 16/081,230

(22) PCT Filed: Feb. 28, 2017

(86) PCT No.: PCT/US2017/019828
§ 371 (c)(1),
(2) Date: Aug. 30, 2018

(87) PCT Pub. No.: WO2017/151546
PCT Pub. Date: Sep. 8, 2017

(65) Prior Publication Data
US 2019/0073230 A1    Mar. 7, 2019

Related U.S. Application Data

(60) Provisional application No. 62/301,909, filed on Mar. 1, 2016, provisional application No. 62/351,583, filed on Jun. 17, 2016.

(51) Int. Cl.
G06F 9/445    (2018.01)
G06F 8/71    (2018.01)
(Continued)

(52) U.S. Cl.
CPC ............ *G06F 9/44542* (2013.01); *G06F 8/71* (2013.01); *G06F 9/3017* (2013.01);
(Continued)

(58) Field of Classification Search
None
See application file for complete search history.

(56) References Cited

U.S. PATENT DOCUMENTS 8,387,032 B1    2/2013    Goldman et al.
8,683,453 B2    3/2014    Patel et al.
(Continued)

OTHER PUBLICATIONS

Supplementary European Search Report for Application No. EP17760569, dated Oct. 25, 2019.
(Continued)

*Primary Examiner* — Ryan D. Coyer
(74) *Attorney, Agent, or Firm* — Moser Taboada

(57) ABSTRACT

A method for modifying a native runtime environment comprising modifying symbols in the least one of a compiled executable or byte-code of each of a plurality of library versions, modifying references to the symbols in development code associated with the at least one of the compiled executable or byte-code, building the development code into a plurality of versioned library packages, renaming identifiers in each of the versioned library packages and modify an application build for the native runtime environment to reference each of the versioned library packages according to their renamed identifiers.

10 Claims, 7 Drawing Sheets

(51) Int. Cl.
    *G06F 9/30*     (2018.01)
    *G06F 8/54*     (2018.01)
    *G06F 9/455*    (2018.01)

(52) U.S. Cl.
    CPC ...... *G06F 9/44505* (2013.01); *G06F 9/44536* (2013.01); *G06F 9/44568* (2013.01); *G06F 8/54* (2013.01); *G06F 9/45508* (2013.01)

(56) References Cited

U.S. PATENT DOCUMENTS

| | | | | |
|---|---|---|---|---|
| 2006/0282840 A1* | 12/2006 | Stone | ................. | G06F 9/44521 |
| | | | | 719/331 |
| 2010/0229163 A1* | 9/2010 | Rolland | ................. | G06F 21/14 |
| | | | | 717/159 |
| 2012/0102485 A1* | 4/2012 | Goldman | ................. | G06F 8/64 |
| | | | | 717/176 |
| 2012/0131538 A1* | 5/2012 | Das | ................. | G06F 8/70 |
| | | | | 717/100 |
| 2012/0131539 A1* | 5/2012 | Das | ................. | G06F 11/3604 |
| | | | | 717/100 |
| 2013/0166509 A1 | 6/2013 | Clark et al. | | |
| 2013/0326492 A1* | 12/2013 | Hunt | ................. | G06F 9/44521 |
| | | | | 717/163 |
| 2015/0249675 A1* | 9/2015 | Yeung | ................. | H04L 29/08072 |
| | | | | 726/22 |
| 2015/0339140 A1 | 11/2015 | Murray et al. | | |
| 2016/0041895 A1* | 2/2016 | Galvin | ................. | G06F 40/242 |
| | | | | 717/130 |
| 2018/0217851 A1* | 8/2018 | Sirajuddin | ................. | G06F 9/44521 |

OTHER PUBLICATIONS

International Search Report and Written Opinion dated May 24, 2017 for PCT Application No. PCT/US2017/019828.

* cited by examiner

METHOD AND APPARATUS FOR LOADING MULTIPLE DIFFERING VERSIONS OF A NATIVE LIBRARY INTO A NATIVE ENVIRONMENT

BACKGROUND

Field

Embodiments generally relate to loading libraries in applications, and particularly towards a method and apparatus for loading multiple differing versions of a native library into a native environment.

Description of the Related Art

Recent application development trends in mobile development have trended towards utilizing standard and well-known languages such as JavaScript to perform native app development. For example, developers can use a form of adapted JavaScript in order to write an app from start to finish, and deploy the app to a mobile phone, all while the app gives off the feel of the native environment with respect to user interface (UI) and UI flow, whether it be ANDROID, iOS, WINDOWS MOBILE, or the like.

In order to achieve a native feel in user interfaces using non-native code, developers have created specialized development frameworks incorporating JavaScript such as React Native. React Native allows well-known JavaScript libraries to be used to code front-end applications, while in the mid-tier layer, these front-end library calls invoke native libraries, for example Java libraries on ANDROID and Objective C libraries on iOS. Similarly, native application program interfaces (APIs) are exposed via JavaScript interfaces, allowing platform-related calls such as message handling, gesture-detection and the like to be handled at the JavaScript level. However, often there is not an easy way to browse and execute these scripts on mobile devices without engaging in the lengthy application compilation and packaging process.

Therefore there is a need in the art for an application runtime that can browse and execute JavaScript applications on the fly. Further, these libraries often evolve at a dizzying pace and new versions are released often making applications developed for earlier versions obsolete. Therefore, it is desirable that such an application runtime allow loading of different versions of the same library for backwards compatibility.

SUMMARY

According to one embodiment, there is provided a method and apparatus for loading multiple differing versions of a native library into a native environment.

Other and further embodiments of the present disclosure are described below.

BRIEF DESCRIPTION OF THE DRAWINGS

So that the manner in which the above recited features of the present embodiments can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
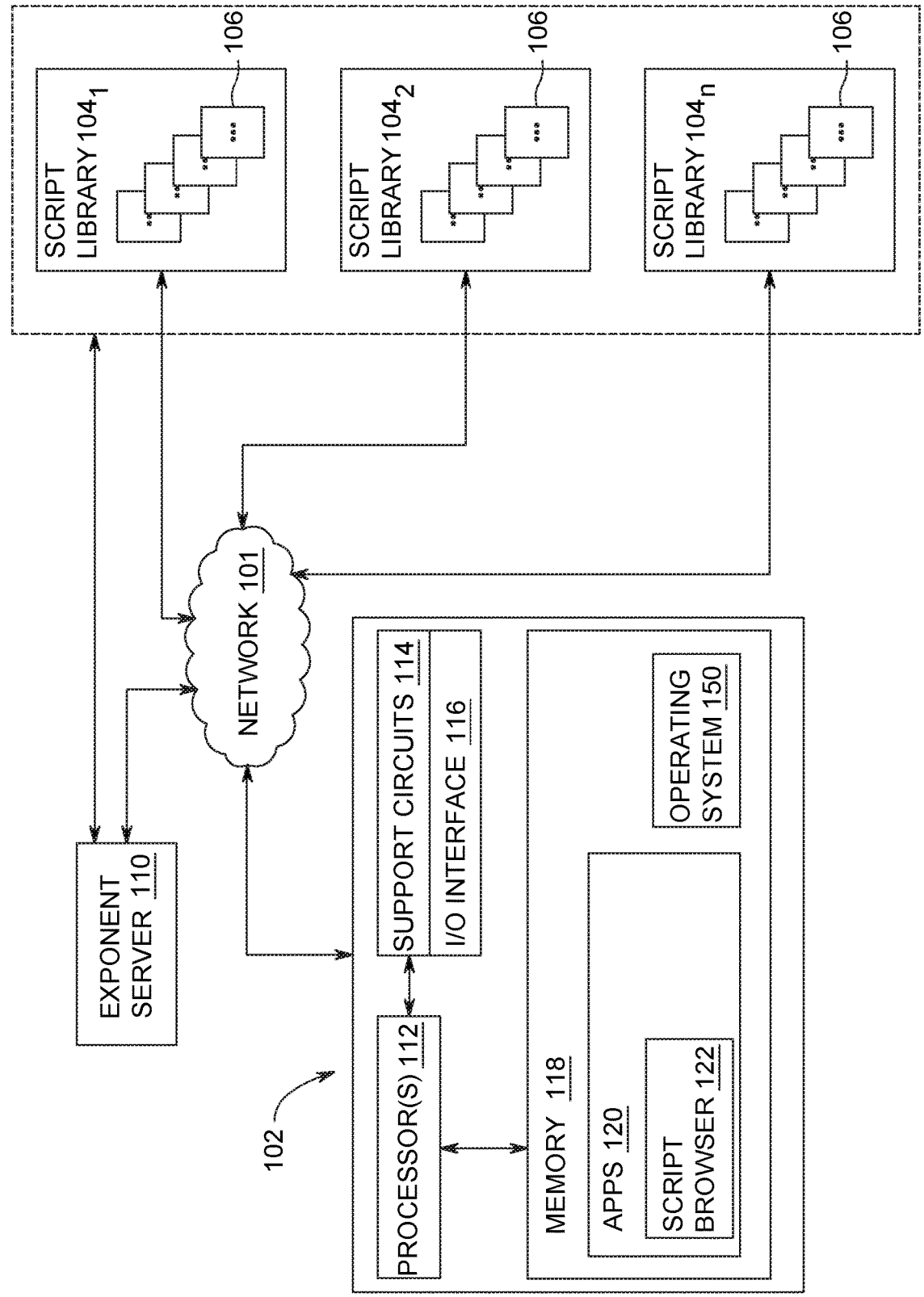
FIG. 1 illustrates a mobile device browsing for various script libraries across a network in accordance with exemplary embodiments described herein.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments disclosed herein generally relate to a tool that packages multiple versions of the same library into an application package for a mobile application runtime. In particular embodiments, the current library is placed in a temporary location, while a versioning tool inspects an older version of the library and renames function calls at the native code level and the development code level. Generally, the older versions of the library are recompiled and stored in a package file and have their classes and packages renamed to match. The mobile application runtime is then rebuilt including the multiple versions.

There are existing tools for renaming classes (e.g., "jar-jar") but there aren't other examples of tools that rename the interfaces between a development language (e.g., Java and Objective C) and native (e.g., C, C++) code. This is important in applications that invoke native libraries and have intercommunication between development code and native code. Additionally, the present application allows for switching between versions of native libraries at runtime. In most other cases it is known ahead of time that different parts of your code use different versions of a library. In the present embodiment, the mobile application executes the script library using whatever version of the native library the script library requests, but the application executes the most current version of the native library in all other instances.

It is noted that there are two "version numbers" at play in the present application: when discussing the native library (e.g., React Native), version number refers to the version of the code in the native library; when discussing the script browser, the version number encompasses the native library version, native library plugin versions and the script browser APIs.

FIG. 1 illustrates a mobile device 102 browsing for various script libraries using a script browsing application on the device, across a network 101 in accordance with exemplary embodiments described herein. In some embodiments, the device 102 may be preprogrammed with a set of known locations for script libraries. In other embodiments, the device 102 may receive a list of script locations via a third party service, or via manual entry. In some instances, the mobile device 102 may operate using both methods in various capacities. Ultimately, the device 102 has access to one or more script libraries $104_1$ to $104_n$. Each of these script libraries contains one or more scripts 106. These scripts contain segments of code that is executed by a script interpreter. An example of scripting code includes Python, shell script, PERL, JavaScript, and the like. Each of these sets of languages are "interpreted" in that they are not compiled down to machine code and executed by the processor. Instead, the script interpreter translates the code to the machine code level and causes the processor to execute this code. In this way, the code itself doesn't need to be compiled to a particular machine code, but can be distributed and shared to run on any machine that has a script interpreter.

Mobile device 102 has, according to some embodiments, at least: one or more processors 112 coupled to support circuits 114, an I/O interface 116 and memory 118. The memory 18 may comprise several apps 120 installed on the device 102 and an operating system 150 to control hardware of device 102. The memory 118 may include one or more of the following: random access memory, read only memory, magneto-resistive read/write memory, optical read/write memory, cache memory, magnetic read/write memory, and the like, as well as signal-bearing media as described below.

The apps 120 may include a script browser 122 installed therein which executes multiple scripts. Similar to a web browser, the user can browse these various scripts using the script browser 122, illustrated further in FIG. 2. In some instances, the scripts may be composed using JavaScript, or a JavaScript framework such as REACT by FACEBOOK. In these instances, the script browser contains a script interpreter that can interpret and execute REACT script on the mobile device by encapsulating a REACT NATIVE runtime.

The mobile device 102 is also in communication with the EXPONENT server 110, which returns a version of the script libraries ($104_1$ to $104_n$) that is compatible with the native versioned code. The Exponent app on the mobile device 102 has a list of valid software development kit (SDK versions) which is transmitted to the server whenever the app requests a script library. When this happens the Exponent server searches through the metadata for each version of that script library to find the newest version of that script library that is compatible with one of the app's SDK versions. The server then sends that script library to the app along with metadata containing the SDK version that script library was created with.

The script browser 122 also is able to switch between versions of native libraries (e.g., REACT NATIVE versions) at runtime, as the user browses and selects a script to execute. Thus the script library can run on whatever version of the native library requested by the script, however, the script browser 122 uses the current version of the native library in all of its other operations.

Figure 2:
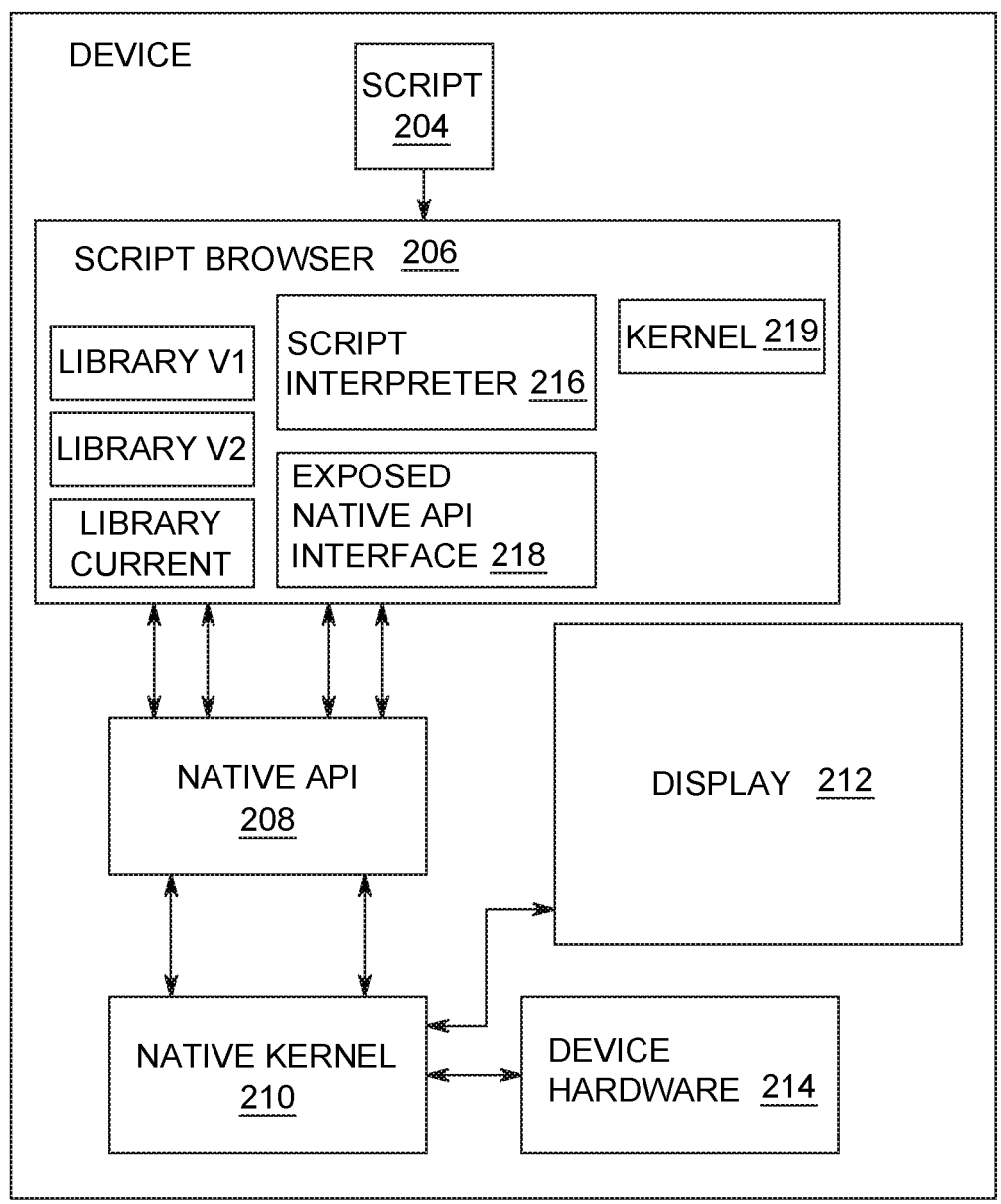
FIG. 2 is a block diagram of a script browser in accordance with exemplary embodiments described herein.

FIG. 2 is a block diagram of a script browser 206 in accordance with exemplary embodiments described herein.

The script browser 206 is an application installed on the mobile device 102 which executes one or more scripts, e.g., a script 204 from script libraries $104_1 \ldots _n$. The script browser 206 comprises a script interpreter 216, an exposed native API interface 218 and various libraries, including multiple versions of the same native library V1, V2 and library current, and a kernel 219. Those of ordinary skill in the art will recognize that the script interpreter 216 may interpret any type of script or multiple script types. For example, the script interpreter 216 may interpret REACT JavaScript (REACT NATIVE JS), PYTHON, PERL, or the like, and is not limited thereto.

The script interpreter 216 may call a REACT NATIVE runtime in order to execute the script 204, where the script 204 is a REACT NATIVE JS script. In some instances, it is desirable to allow scripts that are directed to previous versions of the scripting framework (e.g., REACT NATIVE) to also be executable by the script interpreter 216. Accordingly, the script browser 206 contains multiple runtime environments, illustrated as library v1, library v2 and library current, where v1 and v2 indicate previous versions of the runtime library while current indicates the current production version of the runtime library.

The exposed native API interface 218 comprises a set of functions that script 204 calls in order to effectuate a display change, inspect state of the hardware, or other calls dependent on native access to functionality of the mobile device 102. These exposed interfaces 218 act as liaisons to the lower level native API 208. The native API 208 has direct access to the native kernel 210 of the operating system of device 102. The native kernel 210 can interact with the display 212 or device hardware 214. Thus, calls to the exposed native API interface 218 find their way to the device hardware 214 via the native kernel 210.

Those of ordinary skill in the art will recognize that the script browser 206 may be an ANDROID application, an iOS application, or an application that runs on any number of underlying mobile or non-mobile operating systems, not limited to those disclosed here. Further, the script browser 206 and the methods described with respect to FIG. 3-5 may apply to different development environments, including Android development, iOS development, Windows Mobile development or the like. The development code and the native code may be Java, C++, Objective C, C# or any other language generally used for development. The invention does not limit the embodiments to the development languages, scripting frameworks or underlying operating systems described herein; instead the embodiments described herein are intended to apply to any system where development code invokes native code and there is intra-communication between the two, thus repackaging the system requires inspecting and changing the code accordingly in whichever way is appropriate for the system. The term package is used throughout the application normally associated with JAVA, but is interchangeable with namespace or any other grouping identifier for modules or packages of an application.

Figure 3:
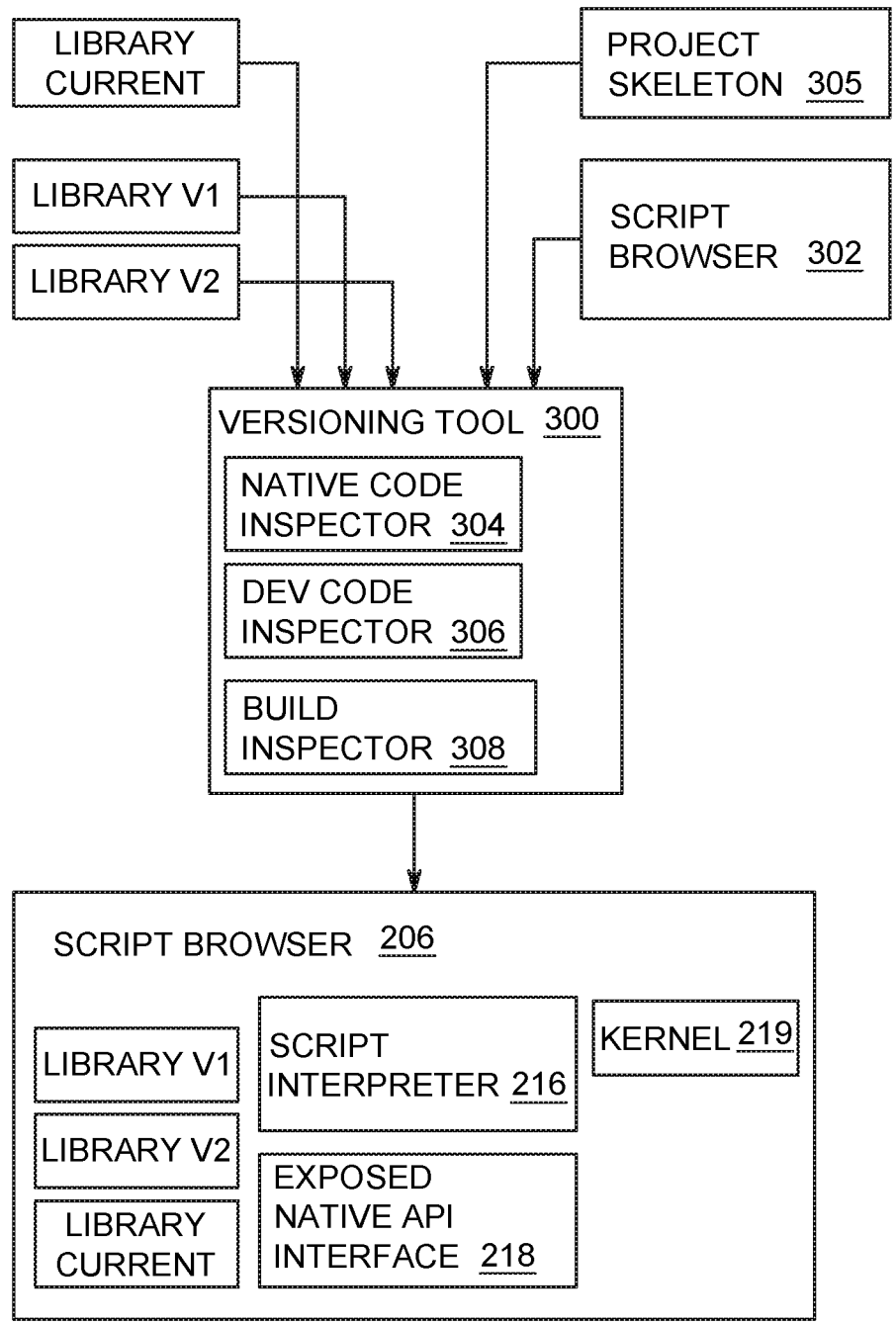
FIG. 3 is a block diagram of a versioning tool for an application in accordance with exemplary embodiments described herein.

FIG. 3 is a block diagram of a versioning tool 300 for an application in accordance with exemplary embodiments described herein.

The versioning tool 300 comprises a native code inspector 304, a development code inspector 306 and a build inspector 308. The versioning tool 300 takes as input, each of the versions of the library to be supported, a project skeleton 305 and the script browser 302 without the multiple versions loaded. The versioning tool 300 performs various functions on the inputs and outputs an application package for the script browser 206 which contains the proper runtime environments for supported versions of the Scripting framework (e.g., multiple versions of React Native).

The versioning tool 300 specifically performs several tasks. Initially, the native code of the libraries, e.g., library v1, is inspected by the native code inspector 304, relocating the library to the project skeleton 305 and assigning a version number to the library. Once moved, the library renames preselected references to function calls in the native portion of the library (e.g., C code, C++ code, or the like, that interfaces between Java code running on a virtual machine, or Objective C code, or the like, and the underlying operating system). Subsequently build files are modified to include references to the version number of the library along with the library name (referred to as the "versioned library"). The development code inspector 306 inspects the development code of the library, for example, the Java code for ANDROID based applications. This development code is modified to load the versioned library previously specified by the native code inspector 304.

The project skeleton 305 of the versioned library is cleaned and a build is run to create a package file for the versioned library. At this point, the package contains versioned native code and un-versioned development code. In some optional embodiments, the package is expanded into a temporary directory for debugging purposes. Classes inside the package (or temporary directory) are renamed to reference to the versioned library by the build inspector 308. The build inspector 308 also renames packages in other platform dependent files to identify particular libraries (e.g., manifest files in ANDROID). Once complete, the package is recreated (or compressed) using the modified files by the build inspector 308, while also adding the new versioned library name and number to platform specific files along with a list of valid versions. Finally, the build inspector 308 performs some other platform specific tasks to clean up any references in existing development code (e.g., development code for the script browser) to refer to the various versioned numbers of the library.

According to one embodiment, an example where multiple versions of the REACT NATIVE runtime are loaded into the EXPONENT (script browser) ANDROID application is shown below. Those of ordinary skill in art will recognize that the filenames shown below are for purposes of illustration and do not limit the invention such that other filenames and directories may be used with no impact on the methods described herein. Further, IOS and other mobile system's application packaging involves similar steps as those described below with minor modifications. According to one embodiment, the steps involved in iOS packaging and runtime execution are separately described further below with respect to FIG. 6 and FIG. 7.

Once the EXPONENT application is deployed on a device, older versions of REACT NATIVE are stored as ".aar" files in the "android/app/libs/" directory in an application package, or during development, in a development workstation's file structure. The current version of RN is in "android/ReactAndroid". In exemplary embodiments, the script browser 206 selects a version of REACT NATIVE to use based on the script, or, "experience's" "package.json" file that is selected by a user. For example, the "package.json" file (a descriptor file for the script selected by the user) may contain "{ exp: { "sdkVersion": "4.0.0" }, ... }", where 4.0.0 is the Exponent version. If "sdkVersion" is set to "UNVERSIONED", Exponent uses the version of REACT NATIVE in android/ReactAndroid. Otherwise it uses the ".aar" file corresponding to the version specified in "sdkVersion". A kernel of the script browser 206 uses the un-versioned copy of REACT NATIVE. Native modules and everything else in the package "versioned.host.exp.exponent" are duplicated for each version of REACT NATIVE.

In this example, the current version of REACT NATIVE is "react-native #2016-01-19" and the developer would like to save the current state into EXPONENT version 5.0.0. Executing the versioning tool 300 adds a new ".aar" file in the "android/app/libs/" directory, add that file to the script browser 206 "build.gradle" file (a build file used by the utility "GRADLE"), copies everything under the package "versioned.host.exp.exponent" (where exponent is the package name for the script browser 206) into the package "sdk5_0_0.host.exp.exponent", and patch up all the places where the new REACT NATIVE version is used in the development Java code.

More specifically, several tasks will be performed by the versioning tool 300.

First, the versioned react native will be updated by copying "android/ReactAndroid" into "android/versioned-react-native/ReactAndroid", where "versioned-react-native" is just a simple Android Studio (or any development environment) project that is uses to build ReactAndroid into an ".aar" file.

Then, references in the native libraries are renamed. Specifically, the native code inspector 304 renames references to Java methods in JNI code. The native code inspector 304 also replaces any references to the folder structure "com/facebook/react/" with "sdk5_0_0/com/facebook/react/". Finally, the native code inspector 304 replaces all other packages that will be renamed in the Java code. In some embodiments, these packages are indicated in a file named "android-packages-to-rename.txt", though the package names may be obtained through any file or other service.

The native code inspector 304 updates fields in the make (e.g., ".mk") files including: "LOCAL_MODULE", "LOCAL_SHARED_LIBRARIES", "LOCAL_STATIC_LIBRARIES" in order to rename the generated ".so" shared object files. Finally, the native code inspector 304 modifies Java code to load the versioned JNI libraries.

The development code inspector 306 cleans and builds the versioned-react-native project. This creates an ".aar" file with versioned JNI code and un-versioned Java code (except for where the Java code loads the JNI libs). Next, development code inspector 306 may in some embodiments unzip the ".aar" file into a directory "android/app/libs/ReactAndroid-temp", for example. In some embodiments, a known utility, "jarjar", is used to rename classes inside the "ReactAndroid-temp/classes.jar" file and the "ReactAndroid-temp/libs/infer-annotations-1.5.jar" file. The development code inspector 306 then renames all packages listed in "android-packages-to-rename.txt" as well as packages inside "ReactAndroid-temp/AndroidManifest.xml", what GRADLE uses to identify each library. Any shared libraries that do not need to be versioned are removed from the directory structure.

The build inspector 308 zips the temporary directory into a ".aar" file and adds this file to the script browser 302's (e.g., EXPONENT app) build file, e.g., "build.gradle" for GRADLE based builds. The SDK version number "5.0.0" is added to the EXPONENT app's list of valid versions when requesting a script library from the server. The build inspector 308 then updates some portions of the EXPONENT app's Java code where each version of REACT NATIVE is used, for example: classes that implement an interface defined by REACT NATIVE and other places where each version needs to be present at compilation time.

Finally, the build inspector 308 copies all of the Exponent specific code and React Native plugins that need to be versioned into a versioned package. It replaces import and package statements in the copied code to point to the new versioned package. It also replaces import statements that point to React Native with import statements to the versioned ".aar" copy of React Native.

Figure 4:
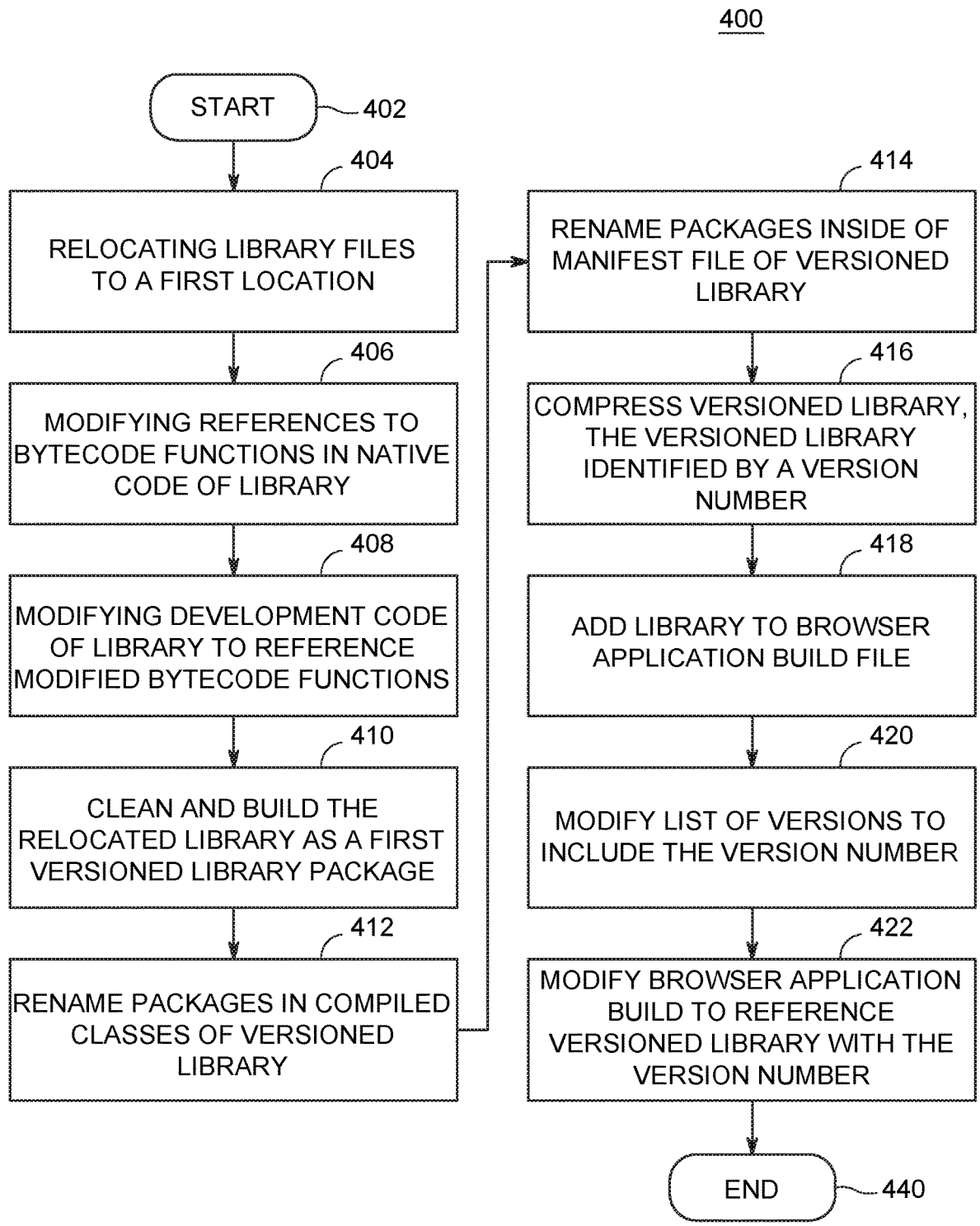
FIG. 4 is a flow diagram for a method for loading multiple versions of a library in the script browser in accordance with exemplary embodiments described herein.

FIG. 4 is a flow diagram for a method 400 for loading multiple versions of a library in the script browser in accordance with exemplary embodiments described herein.

Figure 5:
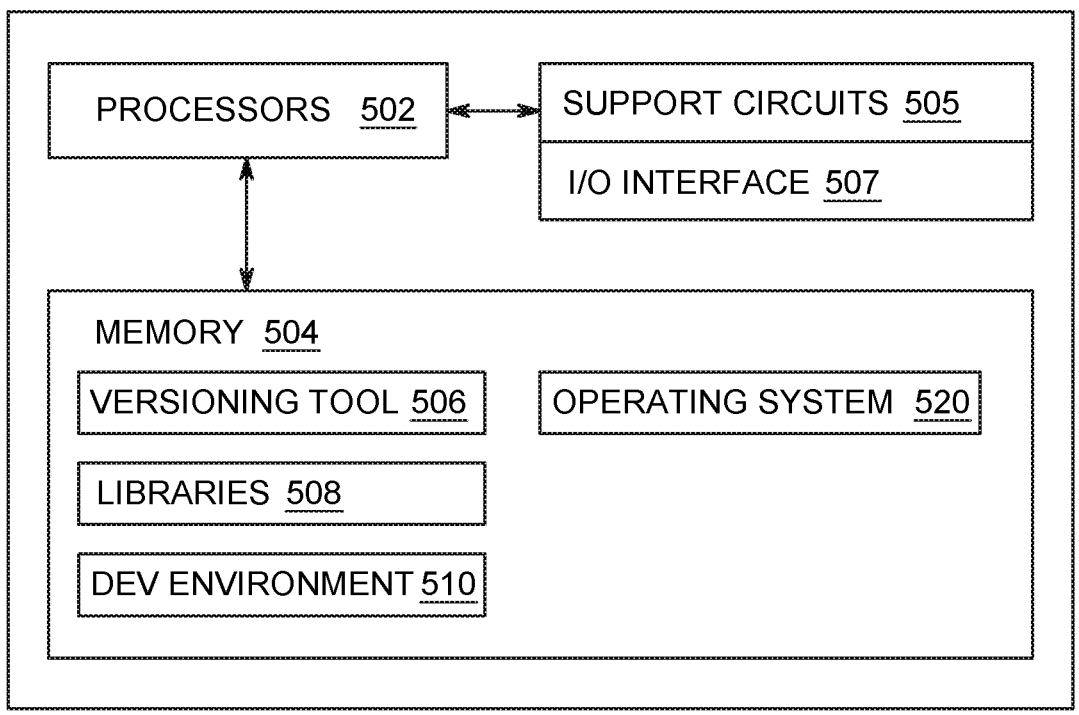
FIG. 5 is a block diagram of a computer system in accordance with exemplary embodiments described herein.

Method 400 is an exemplary implementation of the versioning tool 300 shown in FIG. 3, and executed by one or more processors of the computer system 500 shown in FIG. 5. The method begins at step 402 and proceeds to step 404.

At step 404, the versioning tool 300 relocates dependent library files to a first temporary location. At step 406, references to functions are modified and/or renamed in the byte-code of the native code of the library. Once this is complete, the development code of the native library (e.g., Java code) is modified in step 408 to reference the modified functions from step 404.

At step 410, the relocated library is cleaned and built in a new project as a first versioned library package. Once the library package is built, at step 412, packages inside the classes of the packaged library are renamed to reference the versioned library and at step 414, the packages referenced in the manifest/build files are modified accordingly. At step 416, the versioned library is compressed and identified by a version number and added to a script browser application build file at step 418.

At step 420, a list of versions is modified to include the newest version number so that that a server knows to include this version when a manifest file is requested. At step 422, the script browser application package build is modified to reference the versioned library using the versioned number. The entire application package is bundled again and contains multiple versions of the same library. The method ends at step 440.

FIG. 5 is a block diagram of a computer system in accordance with exemplary embodiments described herein.

The computer system 500 includes processors 502, various support circuits 505, and memory 504. The processors 502 may include one or more microprocessors known in the art. The support circuits 505 for the processor 502 include conventional cache, power supplies, clock circuits, data registers, I/O interface 507, and the like. The I/O interface 507 may be directly coupled to the memory 504 or coupled through the support circuits 505. The I/O interface 507 may also be configured for communication with input devices and/or output devices such as network devices, various storage devices, mouse, keyboard, display, video and audio sensors and the like.

The memory 504, or computer readable medium, stores non-transient processor-executable instructions and/or data that may be executed by and/or used by the processors 502. These processor-executable instructions may comprise firmware, software, and the like, or some combination thereof. Modules having processor-executable instructions that are stored in the memory 504 comprise a versioning tool 506, various libraries 508 and a development environment 510.

The computer system 500 may be programmed with one or more operating systems 520, which may include OS/2, Linux, SOLARIS, UNIX, HPUX, AIX, WINDOWS, IOS, and ANDROID among other known platforms. The memory 504 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 6:
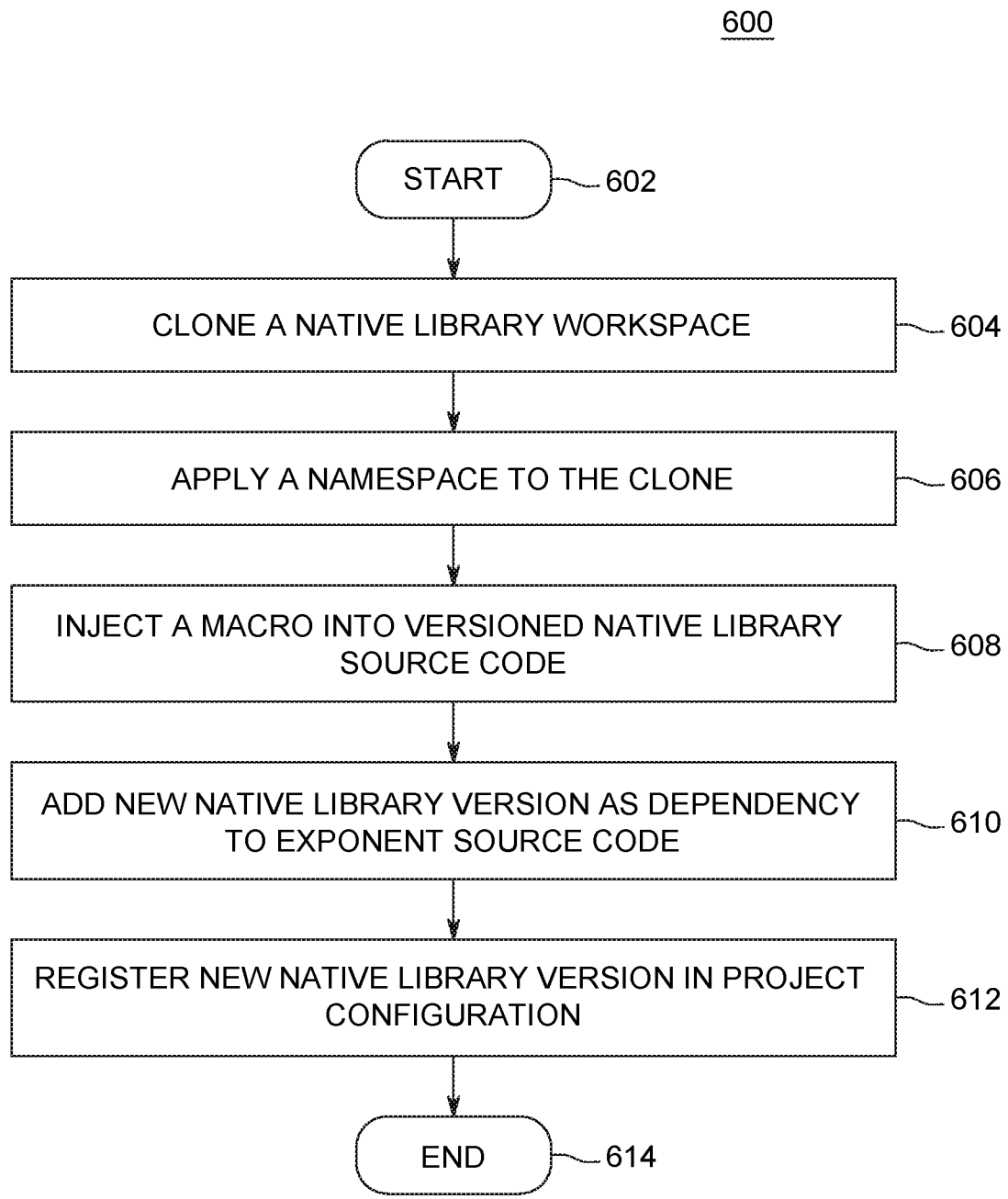
FIG. 6 is a flow diagram of another method for loading multiple versions of a library in the script browser in accordance with exemplary described herein.

FIG. 6 is a flow diagram of another method 600 for loading multiple versions of a library in the script browser 206 in accordance with exemplary embodiments described herein. The method 600 is stored in computer memory, such as memory 504 of FIG. 5, and executed by processor(s) 502.

Method 600 represents an exemplary process for the versioning tool 506 when versioning an iOS build of the script browser 206.

The method begins at step 602 and proceeds to step 604. At step 604, a workspace for the Library Current of FIG. 2 is cloned by the native code inspector 304. In one embodiment, the LIBRARY CURRENT is the React Native library, though other libraries may also be versioned according to method 600.

Step 604 may involve multiple sub-steps. First, the native code inspector 304 copies the source code (e.g., Objective C/C++ for iOS) for the native library from a source directory into a new directory. Second, the cloned source code must be "namespaced". In other words, since Objective C/C++ has a flat/global namespace (i.e., no notion of a package as in Java), all symbols (e.g., classes) must have unique names. Two copies of the native library will not co-compile in the same iOS project because all of their symbol names would collide (i.e. for every class or other type definition RCTSomeSymbol, there would be multiple conflicting definitions of RCTSomeSymbol: One within the original native library, and one within the cloned source code). Within the cloned directory, the native code inspector 304 traverses every file's contents and prefixes the name of every symbol (and every reference to that symbol) in the un-compiled source code.

Those of ordinary skill in the art will recognize that examples of symbols include: any reference to another source code file, e.g. "RCTSomeClass.h", any named preprocessor object, e.g. inline # defines and other macros, any statically named object in the objective-c runtime, e.g. classes, primitive types, global variables and constants, dynamically named objects in the objective-c runtime, e.g. threads, queues, and JavaScript modules, or the like.

For example, a class RCTSomeClass may, for example, have prefix "ABI2-0-0" attached to it so the file name becomes "ABI2-0-0RCTSomeClass". All references to RCTSomeClass everywhere in the cloned source code would also now refer to ABI2-0-0RCTSomeClass after the modifications performed by the native code inspector 304 are complete.

Furthermore, the actual filenames on disk are changed to reflect their contents, e.g. the file RCTSomeClass.h may, for example, get renamed to ABI2-0-0RCTSomeClass.h because Objective C/C++'s method of referring to classes is to import their source code by filename as shown in following code directive:

import "ABI2-0-0RCTSomeClass.h"

Those of ordinary skill in the art will recognize that this describes the general process of namespacing, i.e., disambiguating symbols that previously had the same name. Particular implementation details differ according to the scenario.

After the namespacing in step 606 is complete, namespaced symbols will be referred to as "versioned" code, while un-namespaced symbols will be "un-versioned" code.

The method then proceeds to step 608, where the native code inspector 304 injects a macro into the versioned native library source code.

For some background, the native library generally communicates with JavaScript by sending string literals representing JavaScript method invocations across a bridge to the script runtime from the native API 208.

The script 204 that is ultimately executed on the device 102 has no notion of multiple versions of the native library. The script 204 only specifies which native library version it wants in a configuration file, and then the kernel 219 only starts the script runtime linked against that one specific version of the native library (as further disclosed in FIG. 7, method 700). Therefore, within the context of the script runtime, namespacing performed in step 606 is abstracted away, so the script runtime only sees un-versioned symbol names.

The macro is defined as an inline C function named, for example, EX_REMOVE_VERSION(string) which, at Objective-C/C++ runtime, takes a versioned symbol name (e.g. ABI2-0-0RCTSomeClass) and returns an un-versioned name (e.g. RCTSomeClass). Then the native code inspector 304 injects this function into a few places in the versioned native library source code. Specifically, those places include wherever the bridge sends messages to the script runtime from the exposed native API interface 218.

At step 610, the new native library version is added as a dependency to the source code of the script browser 206 by the development code inspector 306.

In some projects, software called Cocoapods® is used to manage iOS library dependencies. For the new native library clone, the development code inspector 306 creates a description of the library (called a Podspec) and writes that description as a plain text file to the cloned native library source code directory. The Podspec describes the name of the new library (e.g. "ABI2-0-0React") and where to find its contents.

The development code inspector 306 then programmatically modifies the list of dependencies (Podfile) for the script browser 206 project to include a dependency on the new native library clone project.

At step 612, the versioned native library code is registered by the development code inspector 306 in the project configuration of the project for developing the script browser 206.

Some portions of the script browser 206 need to know which native library versions are supported at runtime. Thus a configuration file (in iOS these are in .plist format) is used to indicate that the new version (e.g. 2.0.0) is supported.

The method 600 terminates at step 614.

Figure 7:
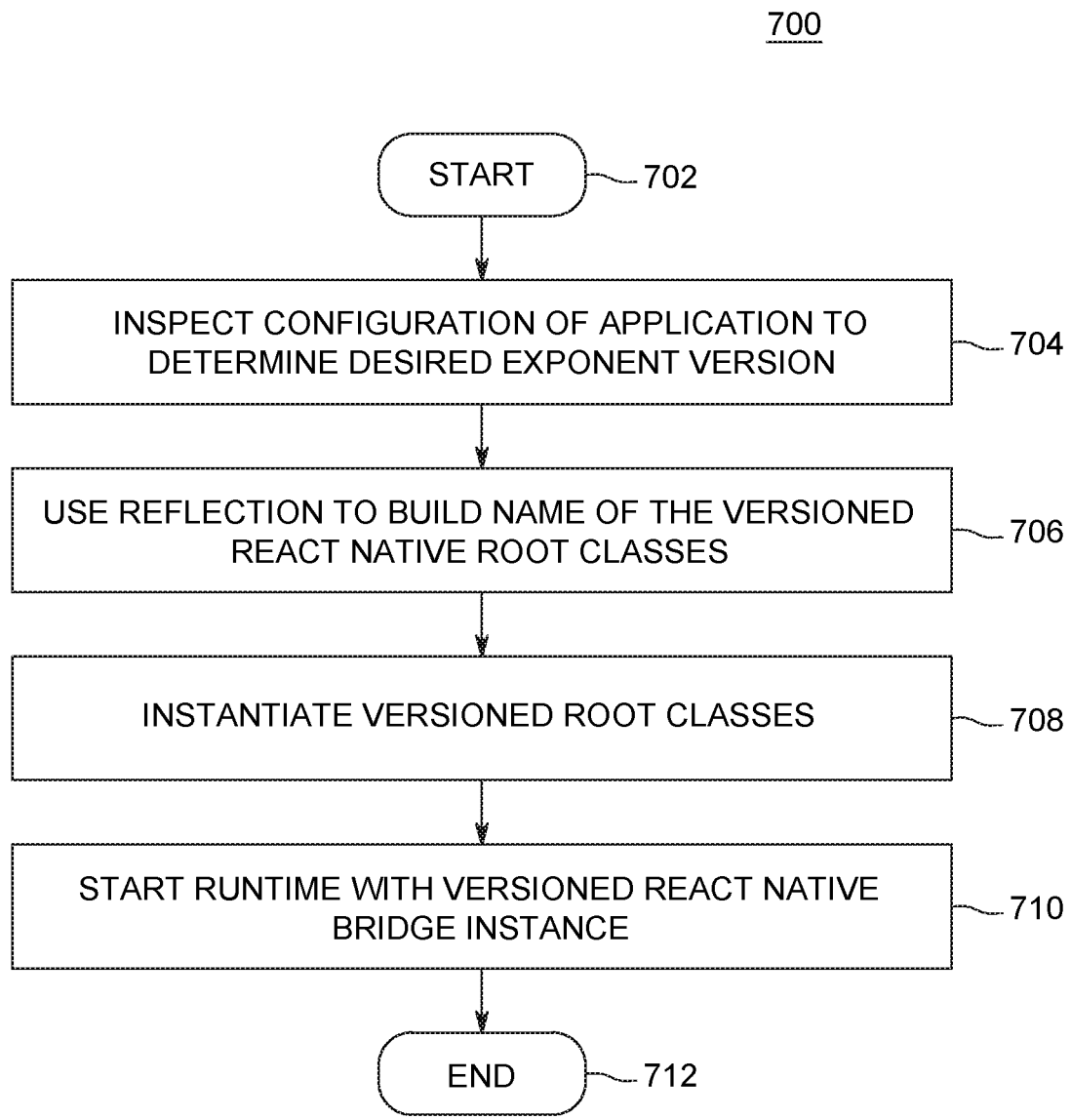
FIG. 7 is a flow diagram for a method for instantiating a copy of a versioned react native instance at runtime in accordance with exemplary embodiments described herein.

FIG. 7 is a flow diagram for a method 700 for instantiating a copy of a versioned react native instance at runtime in accordance with exemplary embodiments described herein. The method 700 is stored in computer memory, such as memory 118 of FIG. 1, and executed by processor(s) 112.

In exemplary embodiments, Exponent is embodied as an iOS application, where an Exponent kernel is always running. The Exponent kernel is a React Native JavaScript app that uses the latest (un-versioned) copy of React Native.

The method begins at step 702 and proceeds to step 704. When a user of the script browser 206 selects a new application from a script library $104_{1\ to\ n}$, in order to execute the new application on their device, the exponent kernel 219 executing in the script browser 206 in FIG. 2, on the underlying device 102, inspects a configuration associated/packaged with the new application in order to determine which version of Exponent is required. In some embodiments, the configuration may be a manifest file packaged with the new application. For example, the new application may require version "2.0.0".

The method then proceeds to step 706, where the exponent kernel 219 uses "reflection" in order to build a name of the versioned React Native root classes.

For example, if the new application requests Exponent version "2.0.0" (e.g., a version name like @"ABI2-0-0"), the kernel 219 will execute computer instructions to instantiate a bridge class with a particular version number. In some instances, the code may resemble the following Objective C code snippet:

Class bridgeClassName=NSClassFromString([NSString stringWithFormat:@"%@%@", versionName, @"RCTBridge"]);

One of ordinary skill in the art will recognize that while the above code is written in Objective C, a similar snippet can be written in Java as shown below:

Class reactInstanceManagerClass=Class.forName(versionName+".ReactInstanceManager");

The method then proceeds to step 708, where the versioned root classes are instantiated. In some embodiments, an Objective C code snippet to accomplish this may include:

id versionedReactNativeBridge=[[bridgeClassName alloc]init];

One of ordinary skill in the art will recognize that while the above code is written in Objective C, a similar snippet can be written in Java as shown below:

Object versionedReactInstanceManager=reactInstanceManagerClass.getConstructor( ).newInstance( )

Now the kernel 219 has an instance of the classes built in method 600, referencing all the other versioned symbols in its particular copy of react native.

At step 710, the script browser 206 is started with the versioned React Native bridge instance, able to execute the new application configured to use Exponent version 2.0.0 (or any version specified in the configuration of the new application).

Those of ordinary skill in the art will recognize that while Objective C and Java code snippets are given above, these are merely exemplary. Other varying languages can be used in appropriate development environments without limiting the embodiments described herein. The method terminates at step 712.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to described embodiments, other and further embodiments may be devised without departing from the basic scope thereof, and the scope thereof is determined by the claims that follow.

The invention claimed is:

1. A method for modifying a native runtime environment comprising:
   modifying symbols in at least one of a compiled executable or byte-code of each of a plurality of library versions;
   modifying references to the symbols in development code associated with the at least one of the compiled executable or byte-code;
   building the development code into a plurality of versioned library packages;
   renaming identifiers in each of the plurality of versioned library packages; and
   modifying an application build for the native runtime environment to reference each of the plurality of versioned library packages according to their renamed identifiers.

2. The method of claim 1, further comprising:
   relocating each of the plurality of library versions into respective temporary locations before modifying the symbols.

3. The method of claim 2, further comprising:
   cleaning each of the relocated plurality of library versions prior to building the development code.

4. The method of claim 3, wherein renaming identifiers further comprises:
   renaming package names in compiled classes of each of the plurality of versioned library packages; and
   renaming package names inside of manifest files of each of the plurality of versioned library packages.

5. The method of claim 4, further comprising:
   compressing each of the plurality of versioned library packages;
   identifying each of the plurality of versioned library packages by a respective version number; and
   building the native runtime environment.

6. The method of claim 1, wherein the native runtime environment is a script browser accessed via a device.

7. The method of claim 6, wherein the plurality of library versions are different versions of a first library.

8. The method of claim 6, further comprising:
   exposing a native application programming interface (API) by the script browser; and
   executing one or more scripts via the script browser, wherein the native API is capable of using the plurality of library versions, wherein the one or more scripts interact with device hardware via the native API, and wherein the native API allows access to a native kernel of the device.

9. The method of claim 6, wherein the script browser allows: selection and execution of one or more scripts, each of the one or more scripts using one of the plurality of library versions.

10. The method of claim 1, wherein the native runtime environment is react native.

* * * * *